Dec. 27, 1966 W. SARAGA 3,294,913

FREQUENCY DIVISION MULTIPLEX SYSTEM FOR SIDEBAND TRANSMISSION

Filed March 19, 1963 5 Sheets-Sheet 1

Dec. 27, 1966 W. SARAGA 3,294,913

FREQUENCY DIVISION MULTIPLEX SYSTEM FOR SIDEBAND TRANSMISSION

Filed March 19, 1963 5 Sheets-Sheet 2

Dec. 27, 1966 W. SARAGA 3,294,913

FREQUENCY DIVISION MULTIPLEX SYSTEM FOR SIDEBAND TRANSMISSION

Filed March 19, 1963 5 Sheets-Sheet 5

United States Patent Office 3,294,913
Patented Dec. 27, 1966

3,294,913

FREQUENCY DIVISION MULTIPLEX SYSTEM FOR SIDEBAND TRANSMISSION

Wolja Saraga, Orpington, Kent, England, assignor to Associated Electrical Industries Limited, London, England, a British company Filed Mar. 19, 1963, Ser. No. 266,384
Claims priority, application Great Britain, Mar. 23, 1962, 11,255/62
10 Claims. (Cl. 179—15)

This invention relates to multi-channel communication systems and in particular to such systems employing frequency division multiplexing, that is, the process of transmitting two or more alternating current signals over a common path by transmitting them in different frequency bands.

In one type of multi-channel frequency division multiplex system different carrier frequencies are allocated to the several communication channels, and an alternating current signal to be transmitted in a particular channel is modulated with the carrier of that channel at a transmit terminal of the system so as to produce at least one sideband. The sidebands produced for the several channels may then be combined for transmission over a common path towards a receive terminal, where the channel sidebands are separated by filtration and demodulated with the appertaining channel carriers so as to obtain the original alternating current signals.

For the purpose of modulating the alternating current signals with the channel carriers it is usual to provide in respect of each, some form of modulator which, being fed with the channel carrier and an alternating current signal to be modulated therewith, produces a modulation product containing both upper and lower sidebands each representing a frequency translation of the alternating current signal as modulated with the carrier. Only one of the sidebands needs to be transmitted to the receive terminal, and the other, unwanted, sideband may therefore be suppressed by means of a suitable filter connected at the output of the modulator. Single sideband transmission permits the use of a greater number of communication channels within a given frequency range.

In contrast to the above the present invention provides a method of modulating alternating current signals with channel carriers, in which a first alternating current signal is combined with a carrier of a first frequency, a second alternating current signal is combined with a carrier of a second, different, frequency, and the resultant combination signals are multiplied together to produce an output signal containing with other frequency components upper and lower sidebands corresponding on the one hand to the modulation product of said first alternating current signal and said second carrier and on the other hand to the modulation product of said second alternating current signal and said first carrier.

By the application of such method the present invention provides for a frequency division multiplex system having at least two carrier channels to which respective carrier frequencies are allocated, a modulation circuit arrangement comprising first combining means for combining the carrier of one channel and an alternating current signal to be transmitted in a second channel, second combining means for combining the carrier of this second channel and an alternating current signal to be transmitted in the first channel, and means for multiplying together the resultant combination signals from said first and second combining means to provide an output containing upper and lower sidebands corresponding to the modulation product of the carrier and the alternating current signal of the said one channel and upper and lower sidebands corresponding to the modulation product of the carrier and the alternating current signal of the said second channel. Single sideband transmission may thereafter be achieved by suppressing by means of suitable filters one of the sidebands of each channel, and the transmitted sidebands may be demodulated at a receive terminal in conventional manner in order to obtain the original frequency signals. However, as will be described later, further filtration may be necessary in order to suppress unwanted frequency components which are produced in addition to the sidebands in the output of the multiplying means.

By combining a channel carrier and an alternating current signal is meant their additive or subtractive combination so as to produce a resultant signal corresponding to their sum or difference. Combining circuits for effecting such additive or subtractive combination are well known, being for instance series or parallel connecting arrangements according as the combining is to be on a voltage or current basis, or possibly hybrid transformers.

In order that the invention may be more fully understood, reference will now be made by way of example to the accompanying drawings in which.

Consider two channel carriers C1 and C2 and two alternating curent signals S1 and S2. Now assume that it is required to form the modulation products S1C1 and S2C2 and that the sum (or difference) of these two products is required as either the final or an intermediate output signal:

$$S\ output = S1C1 + S2C2$$

Figures 1, 2, 3:
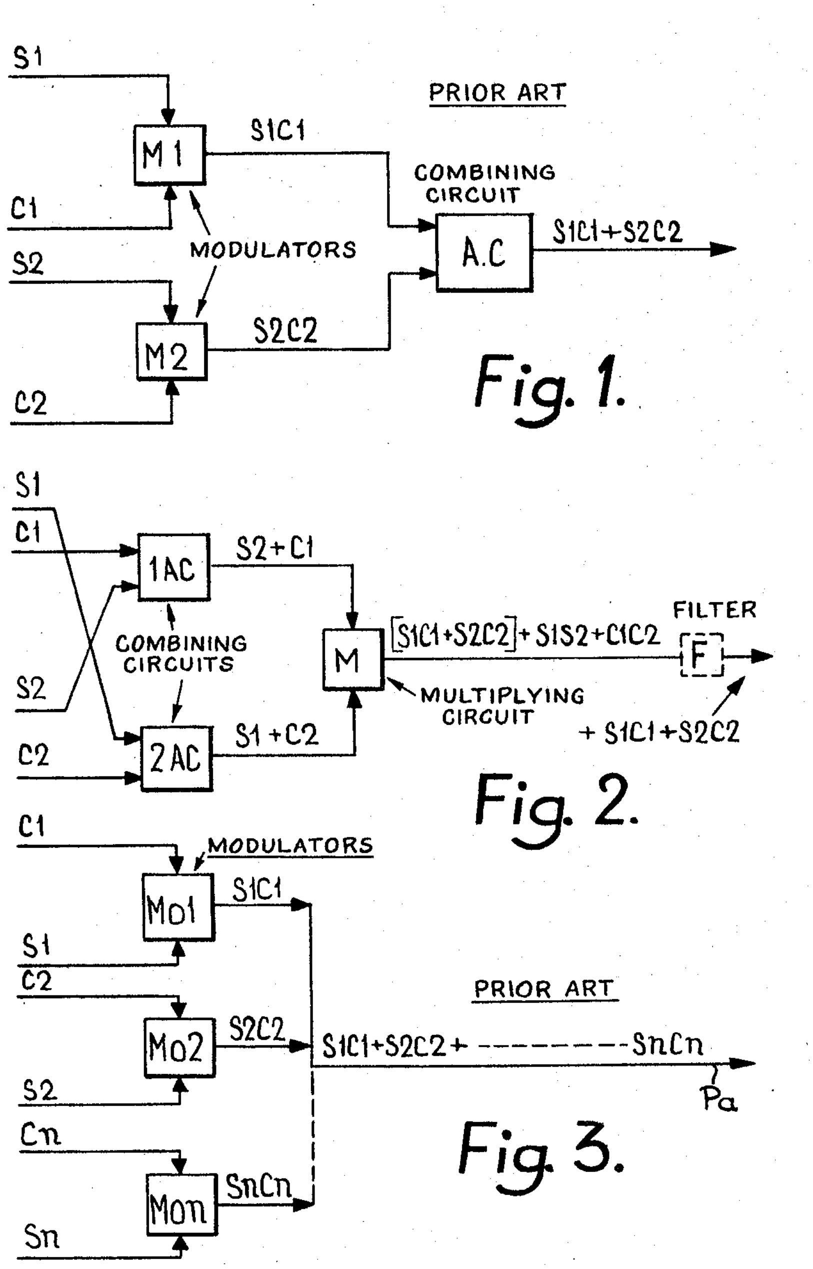
FIG. 1 is a block diagram for illustrating a known method of modulation using a modulator individual to each channel carrier.
FIG. 2 is a block diagram for illustrating the method of modulation according to the invention.
FIG. 3 shows schematically for a double sideband multi-channel frequency division multiplex (F.D.M.) system, a known form of modulation circuit arrangement provided with an individual modulator in respect of each communication channel.

A known method of providing this output signal is by means of the modulation arrangement illustrated in FIG. 1. In this arrangement a first modulator M1 has the carrier C1 and the signal S1 applied to it and produces the modulation product S1C1, and a second modulator M2 has the carrier C2 and the signal S2 applied to it and produces the modulation product S2C2. These two modulation products are then applied to a combining circuit A.C. wherein they are additively combined to form the final (or intermediate) output signal S1C1+S2C2.

In contrast this output signal is provided according to the invention by the modulation arrangement illustrated in FIG. 2. In this latter arrangement a first combining circuit 1AC has the carrier C1 and the signal S2 applied to it and produces a combination signal S2+C1, and a second combining circuit 2AC has the carrier C2 the signal S1 applied to it and produces a combination signal S1+C2. These two combination signals S2+C1 and S1+C2 are then applied to a single multiplying circuit M which produces an output P=(S1C1+S2C2)+S1S2+C1C2. This P output contains the required S output=S1C1+S2C2, but in addition two unwanted terms S1S2 and C1C2 representing additional frequency components which may have to be suppressed, for example by means of a filter F. The term S1C1 represents the double sideband signal of the carrier C1 and the alternating current signal S1, while the term S2C2 represents the double sideband signal of the carrier C2 and the alternating current signal S2. The invention therefore has application in both single sideband and double sideband multi-channel F.D.M. systems as will now be described.

Figure 4:
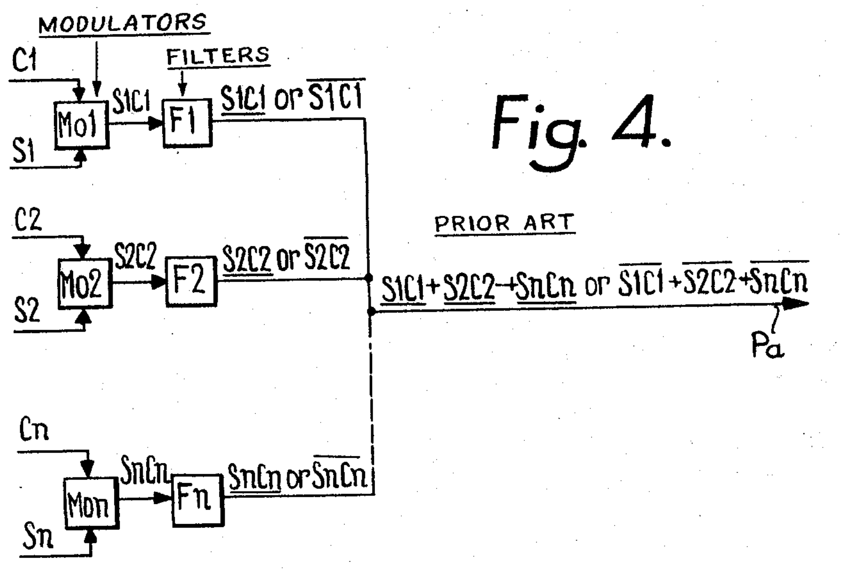
FIG. 4 shows schematically the single sideband version of FIG. 3.

In describing this application of the invention it is convenient to consider first of all the known modulation circuit arrangements illustrated in FIGS. 3 and 4. Referring to FIG. 3, in the modulation circuit arrangement there shown there is provided a plurality of modulators M*o*1 . . . M*on*, one for each of *n* communication channels of the system. Where switching modulators are employed, some filtering may be required to suppress higher order unwanted modulation products which may be produced by the modulators. There are allocated to the *n* communication channels individual channel carriers C1 . . . C*n* of different frequencies which are applied respectively to the modulators M*o*1 . . . M*on* for modulation therein with alternating current input signals S1 . . . S*n* which are also applied respectively to the modulators M*o*1 . . . M*on*. Assuming that each of the modulators M*o*1 . . . M*on* is of a balanced type which suppresses both the channel carrier and the alternating current input signal applied to it, these modulators may be considered as simple multipliers so that the modulation product at the output of each will be a double sideband signal, that is a signal containing both upper and lower sidebands. As shown in FIG. 3 these double sideband signals from the modulators M*o*1 . . . M*on* may be represented respectively by the expressions S1C1, S2C2 . . . S*n*C*n*, which denote the products of the channel carrier frequencies and the alternating current signals. The double sideband signals are combined at the outputs of the modulators for transmission over a communication path P*a*. As illustrated in FIG. 4, in order to obtain upper sidebands $\overline{S1C1}$, $\overline{S2C2}$ . . . $\overline{SnCn}$ or lower sidebands $\underline{S1C1}$, $\underline{S2C2}$ . . . $\underline{SnCn}$ from the double sideband signals, suitable channel filters F1 . . . F*n*, which suppress the unwanted sideband, are provided between each of the modulators M*o*1 . . . M*on* and the common communication path P*a*. The resultant sidebands, upper or lower as the case may be, are then combined for transmission over the common communication path P*a*.

For double sideband transmission it is to be appreciated that in order to avoid one channel interfering with an adjacent channel the frequency difference between the carriers of the two channels is required to be more than twice the highest frequency component ($fs_{max}$) of the alternating current signal to be transmitted in either channel, that is:

$$fc_{i+1}-fc_i>2(fs_{max})$$

where $fc_{i+1}$ and $fc_i$ are the carrier frequencies. For single sideband transmission the frequency difference between the frequencies of the carriers of adjacent channels need only be more than the highest frequency component ($fs_{max}$). However in practice this frequency difference may be greater in order to minimize interference between the channels.

Figure 5:
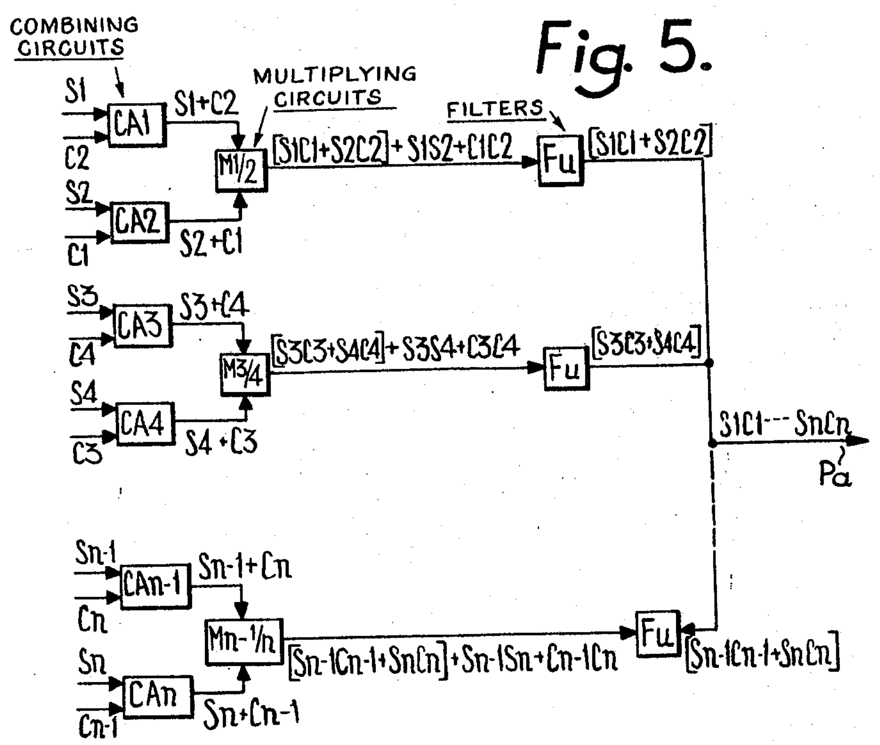
FIG. 5 shows schematically for a double sideband multi-channel F.D.M. system, a modulation circuit arrangement which is provided in conformity with the invention with multiplying circuits in respect of pairs of communication channels.

Turning now to FIG. 5, the modulation circuit arrangement there shown for a multi-channel F.D.M. system is provided in conformity with the invention with multiplying circuits M1/2, M3/4 . . . M*n*–1/*n* each of which serves two channels of the system. The multiplying circuit M1/2 has applied to it two combination signals (S1+C2) and (S2+C1) of which the first combination signal contains the alternating current signal S1 to be transmitted in a first channel of the system and the carrier C2 for the second channel, and the other combination signal contains the alternating current signal S2 to be transmitted in the second channel of the system and the carrier C1 for the first channel. The combination signal (S1+C2) is produced by a combining circuit CA1 to which the signal S1 and the carrier C2 are applied, and the combination signal (S2+C1) is produced by a combining circuit CA2 to which the signal S2 and the carrier C1 are applied. The other multiplying circuits M3/4 . . . M*n*–1/*n* of the system likewise have applied to them respective pairs of combination signals (S3+C4), (S4+C3) . . . (S*n*–1+(C*n*), (S*n*+C*n*–1) which contain the carriers and alternating current signals for other pairs of channels of the system, further combining circuits CA3, CA4 . . . CA*n*–1, CA*n*, respectively producing these other combination signals.

In order to carry the invention into effect each of the multiplying circuits M1/2, M3/4 . . . M*n*–1/*n* is required to have special properties compared with those of a modulator in a conventional carrier system. A modulator in a conventional carrier system has a carrier input circuit and a signal input circuit. The carrier input circuit need not have a linear input-output characteristic, i.e. the output signal amplitude need not be proportional to the input amplitude of the carrier, because it is only the frequency of the carrier which is of importance. In a switching modulator the carrier input circuit may be deliberately made extremely non-linear as this provides the valuable feature that the output signal level is within wide limits substantially independent of the input carrier level. Furthermore the carrier input circuit need not have a wide-band frequency characteristic as only a single frequency signal is applied. In contrast, the signal input circuit of the modulator has to be strictly linear and has to cover the whole frequency band of the input signal, which is usually a wide-band signal.

It will be appreciated that this type of conventional modulator would be wholly unsuitable as a multiplying circuit for the purposes of the present invention. With the present invention a multiplying circuit has wideband input signals applied to both its input circuits and at the same time high frequency carriers are applied to these input circuits. Thus the two input circuits have to have substantially similar frequency characteristics.

This requirement can be expressed by saying that the multiplying circuit has to be symmetrical. This means that its output signal is:

$$z=kxy$$

where $x$ and $y$ are the input signals applied to the two input circuits respectively, and that $k$, a multiplying constant, should remain unchanged if the two input signals are interchanged. This equation implies that the amplitude frequency characteristic of the multiplying circuit is ideal and that there is no phase shift. However, in practice both amplitude-frequency and phase-frequency distortion is permitted either because it is permissible in the final signal or because it can be removed by suitable amplitude and/or phase equalization. There is not even any need for the two input-output characteristics of a multiplying circuit suitable for the present invention to be equal to each other, as long as they are both acceptable. Only in this broad sense need they be similar, and even this kind of similarity need only cover the signal frequency band but not the individual carrier frequencies. It would be perfectly acceptable and sometimes even advantageous to tune each input circuit to its individual carrier frequency (in addition to providing wide band acceptance for the signal band).

In addition, the two input circuits of the multiplying circuit are required to have linear input-output characteristics, linearity being necessary, as explained above, for achieving conventional signal reproduction quality.

Consequently, if in the case of the multiplying circuit M1/2 in FIG. 5, $x=(S1+C2)$ and $y=(S2+C1)$ there will be obtained at the output of this circuit an output signal $z=xy=(S1C1+S2C2)+S1S2+C1C2$. There will likewise be obtained at the outputs of the other multiplying circuits M3/4 . . . M*n*–1/*n* in response to the combination signals applied thereto, respective output signals $$(S3C3+S4C4)+S3S4+C3C4 \ldots$$
$$(Sn\text{–}1Cn\text{–}1+SnCn)+Sn\text{–}1Sn+Cn\text{–}1Cn$$

Comparison with FIG. 3 will show that there has therefore been produced double sideband signals corresponding to the modulation product of the carrier and alternating current signal for each channel of the system, and additionally other frequency components which are represented by the unbracketed terms in these latter expressions. These additional frequency components may be suppressed, if necessary, by means of filters F*u*, which may be of any suitable known form, so that only the double sideband signals S1C1 . . . S*n*C*n* are applied to the common communication path P*a*.

In considering various limiting factors governing the application of the invention to the F.D.M. system shown in FIG. 2, let it be assumed in respect of the two channels served by the multiplying circuit M1/2 that the alternating current signals S1 and S2 cover the same frequency band from *f*1 to *f*2 and that the two carriers C1 and C2 have respective frequencies $fc_1$ and $fc_2$ which differ by $\Delta$: that is $fc_2=fc_1+\Delta$. Then in order to separate (S1C1) from (S2C2):

$$\Delta>2f_2 \qquad (1)$$

It is also necessary to be able to select S1C1+S2C2 from the total output signal $$(S1C1+S2C2)+S1S2+C1C2$$

The highest frequency in the term S1S2 is $2f_2$ and the lowest frequency in the term (S1C1+S2C2) is $fc_1-f_2$; while the term C1C2 contains two frequency components $$fc_1+fc_2$$

and $\Delta=fc_2-fc_1$. Thus the necessary and sufficient conditions for carrying out the invention in this instance are that the following inequalities are satisfied with a sufficient margin:

$$2f_2<fc_1-f_2, \text{ that is } 3f_2<fc_1 \qquad (2)$$

$$fc_2+f_2<fc_1+fc_2, \text{ that is } f_2<fc_1 \qquad (3)$$

and $$\Delta<fc_1-f_2, \text{ that is } \Delta+f_2<fc_1 \qquad (4)$$

Note that inequality (2) implies inequality (3), and (4) implies (2), because of (1). Thus only condition (4) is required.

For example, the following values would be satisfactory: $fc_1=20$ kc./s., $fc_2=28$ kc./s., that is $\Delta=8$ kc./s., $f_1=300$ c./s., $f_2=3.4$ kc./s. With these values inequality (2) requires $10.2<20$ and inequality (4) requires $11.4<16.6$, so that both these inequalities are satisfied. Thus in order to suppress the frequencies represented by the terms S1S2 and C1C2, but to pass the required output (S1C1+S2C2), a filter (F*u*) passing 16.6 kc./s. to 31.4 kc./s. but suppressing frequencies below 6.8 kc./c., the single frequency 8 kc./s., and the single frequency 48 kc./s. would be required.

The same considerations would, of course, apply to the other pairs of channels served by the multiplying circuits M3/4 . . . M*n*–1/*n* in FIG. 2. As aforesaid, the filters F*u* are those provided for suppressing the unwanted multiplication products such as S1S2 and C1C2, but it is envisaged that it may be possible instead to suppress these products by means of a single common filter to which the outputs of the multiplying circuits M1/2 . . . M*n*–1/*n* are applied in common. In this case condition (4), implying (2), still applies. But instead of (3)

$$fc_n+f_2<fc_1+fc_2 \qquad (5)$$

is required which is not covered by (4).

If all carrier frequencies are equidistant and if the frequencies $fc_1, fc_2 \ldots fc_n$ are in ascending order, then (5) can be written in the form $$fc_1+(n-1)\Delta+f_2<fc_1+fc_1+\Delta$$
$$(n-2)\Delta+f_2<fc_1 \qquad (5a)$$

If it is assumed that (5*a*) and (1) are satisfied with a small margin only, then:

$$fc_1\approx f_2+(n-2)\Delta\approx(n-3/2)\Delta \qquad (5b)$$

Similarly:

$$fc_n=fc_1+(n-1)\Delta\approx 2(n-5/4)\Delta \qquad (5c)$$

Thus, approximately, $$fc_n\approx 2fc_1 \qquad (5d)$$

Figure 6:
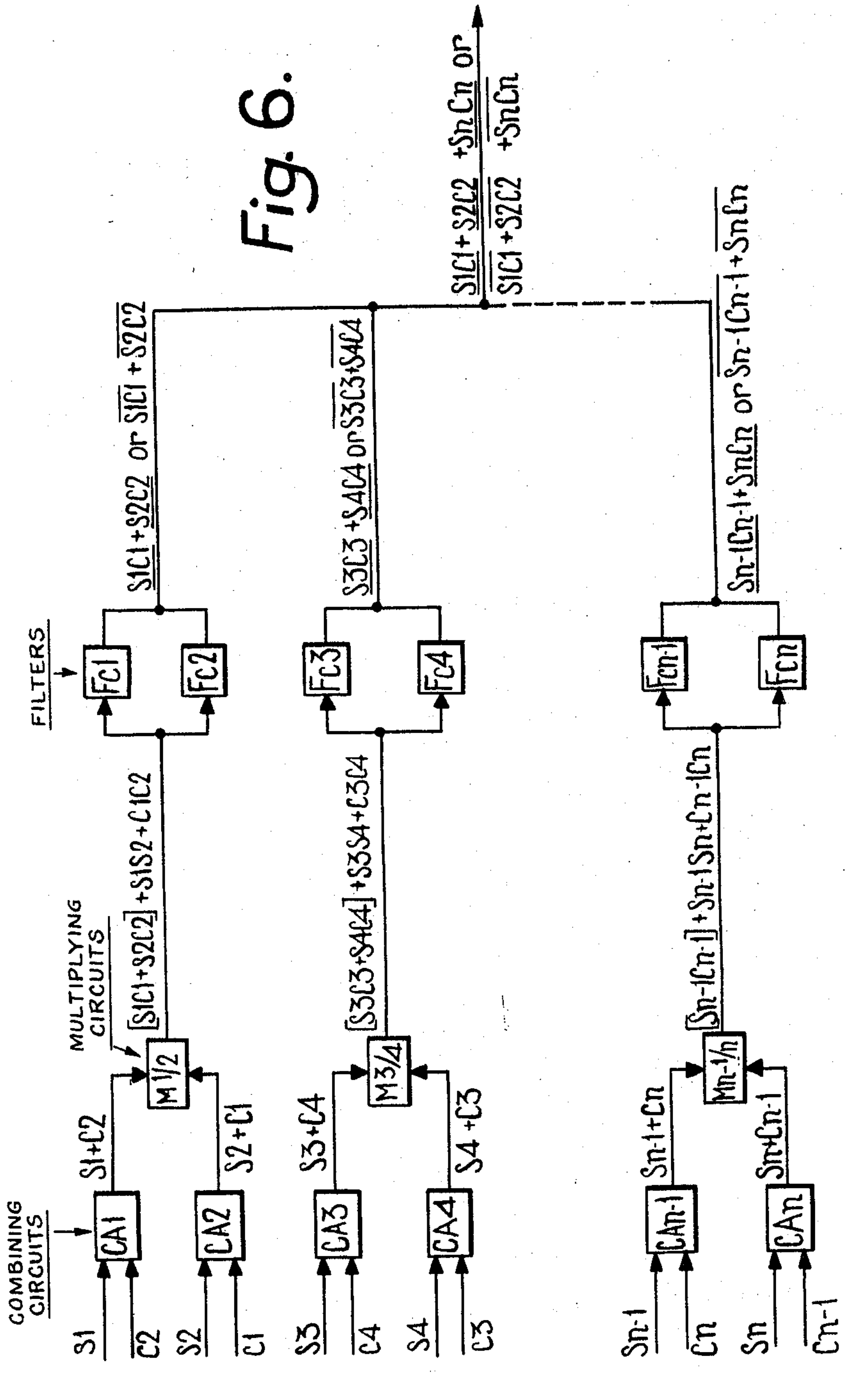
FIG. 6 shows schematically a single sideband version of FIG. 5.

FIG. 6 illustrates a single sideband modulation circuit arrangement conforming to the invention, this arrangement differing from the double sideband arrangement of FIG. 5 in that it includes filters F*c*1 . . . F*cn*. In this present single sideband arrangement lower sideband signals $\underline{S1C1} \ldots \underline{SnCn}$ or upper sideband signals $\overline{S1C1} \ldots \overline{SnCn}$ are obtained from the double sideband signals S1C1 . . . S*n*C*n*, by suppressing the alternate sideband as in the known single sideband arrangement of FIG. 4, sideband suppression being achieved in this instance by the filters F*c*1 . . . F*cn*. By reason of the multiplying circuits M1/2 . . . M*n*–1/*n* each producing sideband signals in respect of two communication channels, the filters F*c*1 . . . F*cn* can be arranged in parallel connected pairs, as indicated, and it is envisaged that each such filter pair may be replaced by a single equivalent filter. Furthermore, these filters also serve for suppressing the unwanted multiplication products S1S2 . . . S*n*–1S*n*+C*n*–1C*n* so that filters such as filters F*u* in FIG. 5 are not necessary in this instance. The individual filters F*c*1 . . . F*cn*, or filters equivalent to the parallel connected pairs thereof, are simply band-pass filters the design of which is well understood in the art.

Consider now the application of the invention to a single sideband 12-channel arrangement which has twelve carriers having frequencies C1 to C12 disposed at 4 kc./s. spacing within a frequency range 60–108 kc./s., and is required to transmit in its channels respective alternating current signals S1 to S12 each covering a frequency band $f_1=0.3$ kc./s. to $f_2=3.4$ kc./s. If, in this instance, channels defined by carriers having adjacent frequencies were paired together, the difference between carrier frequencies applied to the same multiplying circuit would be only 4 kc./s., with the result that the two double sideband signals represented by the terms $S_iC_i+S_{i+1}C_{i+1}$ which are obtained in the output of each multiplying circuit would overlap and it would not therefore be possible to suppress the unwanted sideband (upper or lower) of one double sideband signal without at least partially suppressing the wanted sideband of the other double sideband signal. To avoid this, carriers having non-adjacent frequencies are paired together for application to the same multiplying circuit so that the difference between carrier frequencies applied to the same multiplying circuit now becomes at least 8 kc./s. For instance, if alternate carriers are paired together the difference between carrier frequencies applied to the same multiplying circuit becomes 8 kc./s. and the two double sideband signals are then $S_iC_i+S_{i+2}C_{i+2}$. Also the need for filters to suppress the unwanted frequency components represented by the terms $C_iC_{i+2}$ and $S_iS_{i+2}$ is avoided because the former contains only the frequency 8 kc./s. and frequencies equal to or above 128 kc./s., whereas the latter contains only frequencies from 0 to 6.8 kc./s. None of these frequencies can therefore pass through sideband filters which have nominal pass bands 60–64, 64–68 . . . 104–108 kc./s. and which would be provided to pass a single sideband produced in each channel on to a common communication path.

Figures 7, 8:
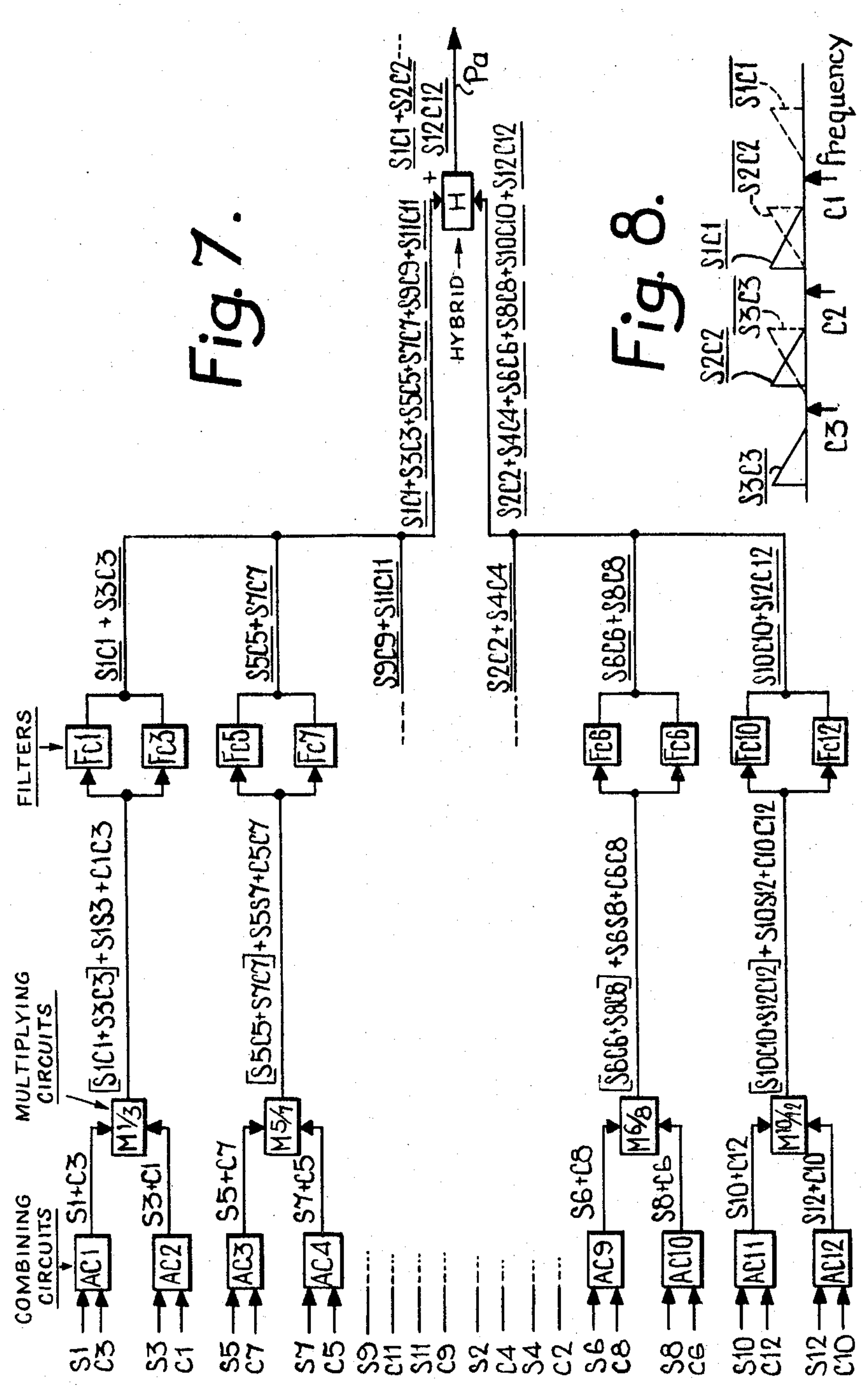
FIG. 7 shows schematically a modified single sideband version of FIG. 5.
FIG. 8 illustrates diagrammatically the sideband positions for the arrangement of FIG. 7.

A 12-channel arrangement having alternate carrier frequencies paired together is illustrated in FIG. 7. In this arrangement, which is thought to be self-explanatory in the light of the foregoing description, pairs of non-adjacent lower sidebands $\underline{S1C1}+\underline{S3C3}$ . . . $\underline{S10C10}+\underline{S12C12}$ are produced and combined on to the common communication path P*a*. It will be seen from FIG. 8 that in respect of adjacent channel carriers the upper sideband of one overlaps the lower sideband of the other. However, since the upper sidebands are suppressed prior to combining there is no interference between the channels.

The invention may also be applied to other forms of multi-channel F.D.M. systems, for example to a single sideband system in which the transmitted sidebands are not all of one type (i.e. upper or lower), but are alternately upper and lower sidebands for adjacent channels.

Figure 9:
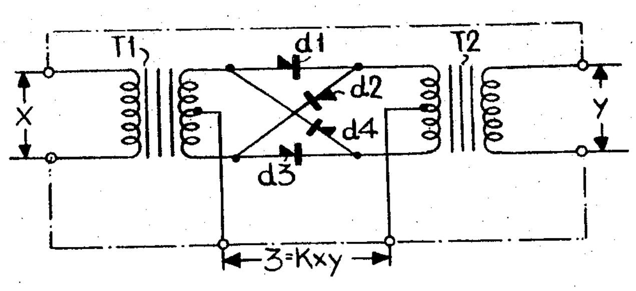
FIG. 9 shows a multiplying circuit suitable for the invention.

A symmetrical multiplying circuit which is suitable for the invention is shown in FIG. 9. This multiplying circuit is essentially a diode-ring circuit comprising four diodes *d*1 to *d*4, but the circuit has been drawn in lattice form in order to illustrate its symmetry. Ideally, the diodes *d*1 to *d*4 should all be identical and this condition may be approached by careful selection of the diodes. In operation of the circuit, input signals $x$ and $y$ applied to the diode-ring by way of input transformers T1 and T2 respectively result in a product signal $z=kxy$ being produced from the centre taps of the transformer secondary windings. A full description of such a diode-ring circuit used as a four-quadrant multiplier is given at pages 1009–1011 of the November 1959 issue of the "Review of Scientific Instruments," which is a monthly publication of the American Institute of Physics.

It is also envisaged that a symmetrical multiplying circuit as required for carrying out the invention may comprise one or two Hall multipliers. In the interests of economy, and from the point of view of stability, a single Hall multiplier may be preferable, but it might not meet the requirements for a symmetrical multiplier because on the one hand its plate input impedance is relatively low and independent of frequency, whereas on the other hand its coil input impedance is usually much higher and, moreover, increases with increase in frequency so that with constant voltage applied to the coil input the magnetic field produced by its coil circuit would decrease as the frequency increases. However, this difficulty in the coil input could be overcome in known manner by appropriate "buffering" by means of pads or amplifying means to obtain a constant input impedance, or by feeding the coil input from a constant current device such as a pentode valve or a common base transistor. The difficulty could also be overcome by providing at either the coil or the plate input, or at both these inputs, amplitude and/or phase equalizing circuits which render the multiplier sufficiently symmetrical with or without buffering or constant current feed at its coil input.

Figure 10:
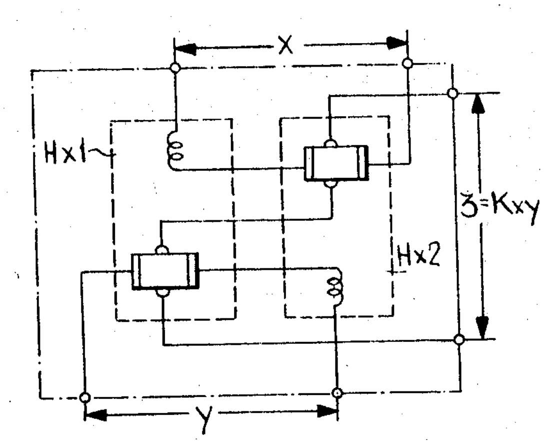
FIG. 10 shows an alternative form of multiplying circuit.

A symmetrical multiplying circuit comprising two Hall multipliers is illustrated in FIG. 10. In this figure two substantially similar Hall multipliers H*x*1 and H*x*2 have their coil and plate input circuits cross-connected in series whereby to form two resulting input circuits having similar input impedances and frequency characteristics. In response to input signals $x$ and $y$ in the form of currents applied to these two resulting input circuits the multiplying circuit provides a product signal $z$ in an output circuit formed by the combination in series (as shown), or in any other suitable way, of the plate output circuits of the two Hall multipliers. This principle of cross-connecting the input circuits of the two Hall multipliers in order to form, for the symetrical multiplying circuit as a whole, resulting input circuits presenting similar impedances and frequency characteristics to input signals, can be applied to other types of asymmetrical multipliers thereby enabling them to be used in pairs as a single unit for the purposes of the invention. It is to be appreciated that the individual input circuits of asymmetrical multipliers could equally well be connected in parallel or in any other suitable way provided that the two resulting input circuits are substantially similar.

What I claim is:

1. For a frequency division multiplex system having at least two carrier channels to which respective carrier frequencies are allocated, a modulation circuit arrangement comprising first combining means for combining the carrier of one channel and an alternating current signal to be transmitted in a second channel, second combining means for combining the carrier of this second channel and an alternating current signal to be transmitted in the first channel, and means for multiplying together the resultant combination signals from said first and second combining means to provide an output containing upper and lower sidebands corresponding to the modulation product of the carrier and the alternating current signal of the said one channel and upper and lower sidebands corresponding to the modulation product of the carrier and the alternating current signal of the said second channel.

2. A frequency division multiplex system in which a plurality of carrier channels to which respective carrier frequencies are allocated are associated in pairs and wherein there is provided in respect of each such pair a modulation circuit arrangement comprising first combining means for combining the carrier of one channel of the relevant pair and an alternating current signal to be transmitted in the other channel of the pair, second combining means for combining the carrier of said other channel and an alternating current signal to be transmitted in said one channel, and means for multiplying together the resultant combination signals from said first and second combining means to provide an output containing upper and lower sidebands corresponding to the modulation product of the carrier and the alternating current signal of the said one channel and upper and lower sidebands corresponding to the modulation product of the carrier and the alternating current signal of the said other channel.

3. A multiplex system as claimed in claim 2 including filter means for suppressing unwanted frequency components produced in addition to the sidebands in the output of the multiplying means in each said modulation circuit arrangement.

4. A multiplex system as claimed in claim 2 including for single sideband transmission filter means for suppressing the unwanted sideband of modulation products in each said modulation circuit arrangement.

5. A multiplex system as claimed in claim 2 wherein said multiplying means in each modulation circuit arrangement is a diode-ring type symmetrical multiplying circuit.

6. A multiplex system as claimed in claim 2 wherein said multiplying means in each modulation circuit arrangement is a Hall multiplier arranged for symmetrical multiplication.

7. A multiplex system as claimed in claim 2 wherein said multiplying means in each modulation circuit arrangement comprises two substantially similar Hall multipliers arranged to form a single symmetrical multiplying circuit, the multipliers having their coil and plate input circuits cross-connected in series or in parallel whereby to form two resulting input circuits having similar input impedances and frequency characteristics.

8. A frequency division multiplex system in which a plurality of carrier channels having respective carrier frequencies in ascending frequency order are associated in pairs in each of which the paired channels have nonadjacent carrier frequencies in said order and for each of which there is provided a modulation circuit arrangement comprising first combining means for combining the carrier of one channel of the relevant pair and an alternating current signal to be transmitted in the other channel of the pair, second combining means for combining the carrier of said other channel and an alternating current signal to be transmitted in said one channel, and means for multiplying together the resulting combination signals from said first and second combining means to provide an output containing upper and lower sidebands corresponding to the modulation product of the carrier and the alternating current signal of the said one channel and upper and lower sidebands corresponding to the modulation product of the carrier and the alternating current signal of the said other channel.

9. A multiplex system as claimed in claim 8 wherein the carrier frequencies of the channels of each pair are separated in said order by a single other carrier frequency therein.

10. A method of modulating alternating current signals with channel carriers, in which a first alternating current signal is combined with a carrier of a first frequency, a second alternating current signal is combined with a carrier of a second, different, frequency, and the resultant combination signals are multiplied together to produce an output signal containing upper and lower sidebands corresponding on the one hand to the modulation product of said first alternating current signal and said second carrier and on the other hand to the modulation product of said second alternating current signal and said first carrier.

References Cited by the Examiner

UNITED STATES PATENTS

| | | | |
|---|---|---|---|
| 2,855,462 | 10/1958 | Adams | 179—15 |
| 3,010,069 | 11/1961 | Mills et al. | 332—40 |

DAVID G. REDINBAUGH, *Primary Examiner.*

ROBERT L. GRIFFIN, *Examiner.*